March 24, 1970 MAKOTO TAKEUCHI ET AL 3,502,962
METHOD OF FIELD/FREQUENCY CONTROL IN GYROMAGNETIC RESONANCE
Filed March 27, 1967 2 Sheets-Sheet 1

INVENTORS.
MAKOTO TAKEUCHI
KAZUO NAKAGAWA
BY
Webb, Burden, Robinson & Webb
ATTORNEYS.

United States Patent Office 3,502,962
Patented Mar. 24, 1970

3,502,962
METHOD OF FIELD/FREQUENCY CONTROL IN GYROMAGNETIC RESONANCE
Makoto Takeuchi and Kazuo Nakagawa, Tokyo, Japan, assignors to Nihon Denshi Kabushiki Kaisha, Tokyo, Japan, a corporation of Japan
Filed Mar. 27, 1967, Ser. No. 626,120
Claims priority, application Japan, Mar. 28, 1966, 41/19,114
Int. Cl. G01n 33/05
U.S. Cl. 324—.5                                        6 Claims

ABSTRACT OF THE DISCLOSURE

A method of field/frequency control in gyromagnetic resonance production and apparatus in which a control sample is utilized to keep the ratio between the intensity of the polarizing magnetic field and the radio frequency a constant. The control sample is shielded from sweep frequency which is applied to the magnetic field regions defined by the main and said band resonances of the control sample, thereby dividing the magnetic field into smaller sweep regions.

---

The present invention provides an improved method for increasing the time stability of the invention described in our copending application, Ser. No. 597,706, filed Nov. 26, 1966, for a Method For Producing Gyromagnetic Resonance. The copending application discloses a method of effectively obtaining and measuring the resonance of nuclei such as $C^{13}$, $P^{31}$, $F^{19}$, and protons that are adjacent to paramagnetic metal, all of which nuclei are characterized by their having large chemical shifts. The pervious invention utilized the nuclear resonance single band method in order to measure the resonance signal of a sample having a large chemical shift by keeping the modulation index $\beta$, in which $$\beta = \frac{\gamma H_m}{\omega_m}$$

where $\gamma$ = the gyromagnetic ratio.
$H_m$ = modulation amplitude of the audio frequency magnetic field, and
$\omega_m$ = angular frequency, less than 1 i.e., $$\beta = \frac{\gamma H_m}{\omega_m} < 1$$

By maintaining the modulation index less than 1, a stable signal base line is maintained. In order to accomplish this, the driving radio frequency ($\omega_1$) magnetic field is set sufficiently large so that only one side band signal reaches the optimum condition and the filter is set so that only one frequency component will pass through. By using the above system, the sweep width is not limited by the modulation frequency, and the signal mode is extremely stable without depending upon a bridge balance. Further, the undesirable side band signals are completely eliminated, with the result that when applying the field/frequency control for wide ranges, signal overlapping does not occur since the side band signals are completely eliminated.

The present invention provides a new method of field/frequency control for use in the aforesaid method and gyromagnetic resonance apparatus.

In the measurement of nuclei possessing magnetic moment, the resonance frequency $\omega$ is generally given by the following formula, $$\omega = \gamma H_0$$

where $\gamma$ = the gyromagnetic ratio
$H_0$ = the polarizing magnetic field.

For example, the gyromagnetic ratio $\gamma$ of fluorine nucleus ($F^{19}$) is $2\pi \times 40.055$ mc./10 kgauss and that of the proton is $2\pi \times 42.5$ mc./10 kgauss. With a polarizing magnetic field intensity of 14,092 gauss, the proton exhibits a resonance frequency of 60 mc. and the $F^{19}$ nucleus exhibits a resonance frequency of 56.446 mc. The chemical shift of $F^{19}$ is anywhere between ten and thirty times greater than that of a proton. For example, the chemical shift of the $F^{19}$ nucleus in organic compounds is approximately 300 p.p.m. When measuring the resonance of the $F^{19}$ nucleus of a $F_2$ molecule, which resonates at the lower side of the polarizing magnetic field, and the $F^{19}$ resonance of hydrogen fluoride (HF) which resonates at the highest side of the polarizing magnetic field, the chemical shift is approximately 625 p.p.m.

On the other hand, the proton generally exhibits a chemical shift of approximately 10 p.p.m. The resonance spectrum line width of the fluorine nucleus is less than 1 c.p.s. and is almost equal to that of the proton, since the spin quantum number is ½ and the spin-lattice ($T_1$) and spin-spin ($T_2$) relaxation times are relatively large. When measuring the resonance signal of the fluorine nucleus, it is necessary to maintain the stability and resolution nearly equal to that of a proton. Furthermore, the region of sweep of the fluoride nucleus measurement is approximately thirty to sixty times wider than in the case of proton measurement.

In general, in order to achieve the required time extended stability factor, a system of so-called field/frequency control is utilized. By means of this system, a predetermined ratio existing between the intensity of the magnetic field and the radio frequency can be maintained. In other words, the field/frequency control system detects the fluctuation of the polarizing magnetic field as a variation of the ratio between the magnetic field and the radio frequency by utilizing the dispersion mode of resonance signal. In this way, the amount of fluctuation is fed back to the magnetic field, thus ensuring that the ratio between the intensity of the magnetic field and the radio frequency remains constant.

When it is necessary to sweep the polarizing magnetic field widely, for example, in the case of measurement of nuclei such as $F^{19}$, $C^{13}$, etc., which have large chemical shifts, it is difficult to obtain a sufficiently high stability using the ordinary field/frequency control system because the spectrum line of the control sample is broadened out due to the field inhomogeneity produced by field sweep coils thereby adversely affecting the stability.

This invention provides a method for increasing the stability of gyromagnetic resonance apparatus utilized for measuring nuclei such as a proton that is adjacent to paramagnetic metal, $F^{19}$, $C^{13}$, and $P^{31}$ all of which exhibit large chemical shifts. In addition, this invention provides a method to increase the stability of gyromagnetic resonance apparatus for broad chemical shifts wherein the fluorine nucleus is measured without side band signal overlapping by means of the nuclear resonance single side band system wherein field/frequency control is applied by using the proton as a control sample, the whole of the sweep region of the polarizing magnetic field being divided into several smaller regions, to each of which the field/frequency control is applied.

These and other features and advantages will become apparent from the following detailed description of the present preferred embodiment of the invention taken in conjunction with the drawings in which, FIGURE 1 is a block diagram showing the single side band gyromagnetic resonance system utilizing our field/frequency control method;

Figure 1:
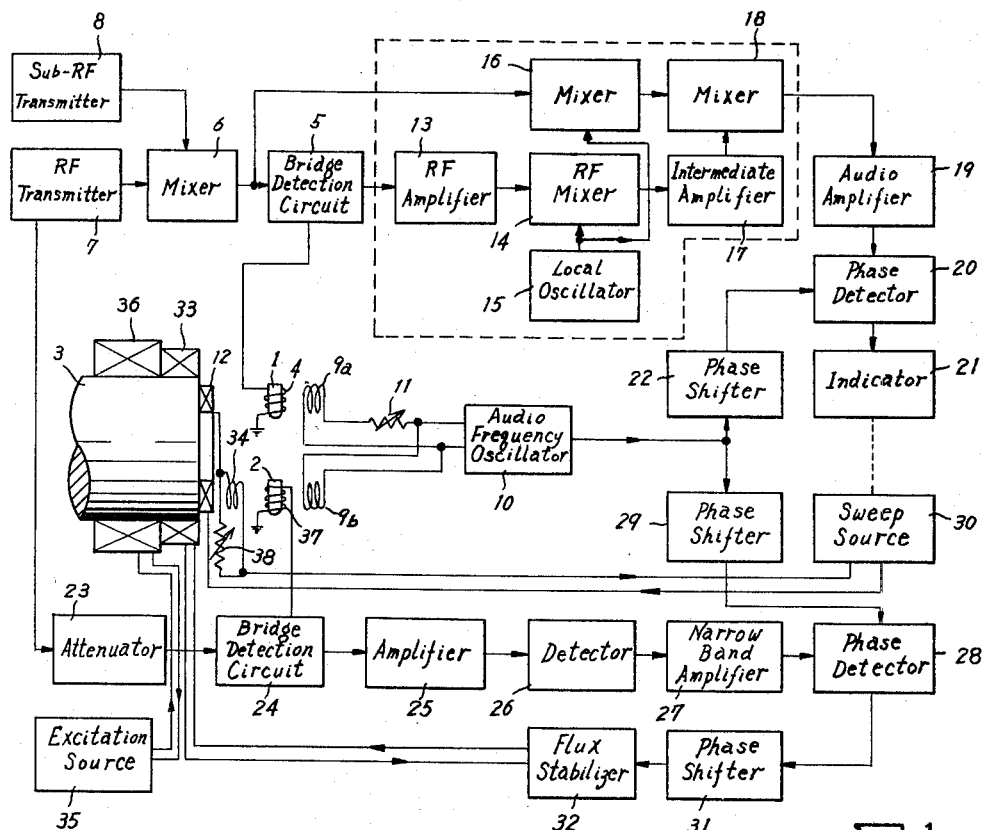

Referring now to FIGURE 1, a sample 1 to be measured and a control sample 2 are placed within a polarizing magnetic field produced by electro-magnet 3, which is excited by excitation source 35 by means of coil 36. For the purpose of explaining our invention, sample 1 is the $F^{19}$ nucleus and the control sample 2 is a proton.

An RF coil 4 supplies a radio frequency driving field ($\omega_1 = 56.446$ mc.) to sample 1 from bridge detection circuit 5. The radio frequency is provided by mixer 6 which mixes a radio frequency (60 mc.) supplied by RF transmitter 7 and a radio frequency (3.554 mc.) supplied by sub-RF transmitter 8. The mixer selects the lower beat signal (60 mc.–3.554 mc.) from the mixed radio frequency; this lower beat signal from the mixer is equal to the resonance frequency of the $F^{19}$ nucleus.

In this arrangement, both transmitters 7 and 8 include a crystal oscillator that maintains a frequency stability of about $10^{-7}$. This stability, however, is not sufficient for high resolution nuclear magnetic resonance measurements. As is well known, the field/frequency control does not maintain the absolute stability of the magnetic field but improves the stability of the ratio between the magnetic field and the radio frequency. Accordingly, the absolute stability of the magnetic field is no better than the stability of the basic RF oscillator. As a result, the absolute stability of the magnetic field is equal to that of the crystal oscillator, which is heat protected, and has a stability of about $10^{-7}$ representing about 6 c.p.s. fluctuation in terms of frequency. However, by means of field/frequency control, the ratio between the intensity of the magnetic field and the radio frequency can be maintained at a stability of better than $10^{-8}$. If the radio frequency applied to the $F^{19}$ sample is supplied by an independent transmitter, i.e., independent of the 60 mc. transmitter, the stability of the nuclear resonance spectrometer will be approximately 8.2 c.p.s. (i.e., $(6^2+5.6^2)^{1/2}=8.2$), which is insufficient for the high resolution nuclear magnetic resonance apparatus. In order to substantially eliminate these fluctuations, it is preferable to have an interrelation between the 60 mc. frequency for the field/frequency control and the 56.446 mc. for the $F^{19}$ sample. For this purpose, the 60 mc. frequency from the RF transmitter and the 3.554 mc. frequency from the sub-RF transmitter are mixed and only one frequency, 56.446 mc. is applied to the $F^{19}$ sample. At this time, the magnetic field is locked at the 60 mc. frequency thus eliminating the magnetic field fluctuations with relation to the 60 mc. frequency. On the other hand, the fluctuations arising from the 3.554 mc. frequency are supplied so as to be in almost the same order as the fluctuations of the said 60 mc. transmitter. The frequency stability is then about 0.3 c.p.s. (i.e., $3.554 \times 10^6 \times 10^{-7} = 0.3$) which is sufficient to to measure the $F^{19}$ nucleus. When measuring the proton which is adjacent to a paramagnetic metal, for example, only the RF field (60 mc.) from the RF transmitter 7 is applied to an RF coil 37 through a bridge detection circuit 24, since the resonance frequency of a proton is 60 mc.

A pair of modulation coils 9a and 9b, arranged coaxially with respect to the unidirectional magnetic field, are supplied with a 2 kc. modulation current by means of audio frequency oscillator 10. The radio frequency driving field is selected so as to produce the optimum resonance condition at the side band for $n=-1$. A variable resistor 11 is utilized to change the value of the modulation index $\beta$.

When the unidirectional magnetic field is swept by means of a sweep coil 12 connected to a sweep source 30, nuclear magnetic resonance $F^{19}$ signals are fed into an RF amplifier 13 in the nuclear resonance single side band system, indicated by the chain line, after passing through the bridge detection circuit 5.

When using the nuclear resonance single side band system, a local oscillator 15 applies a radio frequency ($f = f_0 + f_i$) to both mixers 14 and 16. By mixing the signal fed from the mixer 6 with a predetermined signal from the local oscillator at the mixer 16, an output signal $f_i$ (457 kc.) is produced.

Mixer 14 mixes the signal fed from the RF amplifier 13 with the local oscillator signal, resulting in an output signal of 457 kc. $\pm n$ 2 kc. ($n=0, 1, 2 \ldots$). This signal is then fed into an intermediate frequency amplifier 17 which incorporates a crystal filter. The band-pass width of this filter is selected so as to be much larger than the half width of the resonance signal and at the same time is selected so as to be much smaller than the modulation frequency. Furthermore, the center frequency of the band-pass width is selected to a suitable side band frequency. In this case, 455 kc. is now set as the center frequency and the band-pass width of the filter is set at 500 c.p.s., for example, on either side of the said center frequency. In such cases, the band width of the resonance signal which is carried by the frequency $f_m$(2 kc.) component is fully covered in the band-pass width, and the center band signal such as $f_i$(457 kc.) and other side band frequencies such as $f_i+nf_m(n=0, 1)$, which are undesirable, are completely eliminated from the band-pass region. In other words, all frequency components with the exception of the $f_i-f_m$ component are filtered out. When this signal is mixed with the output $f_i$ derived from a mixer 16 at a mixer 18 stage, an output signal having only one component $f_m$ is selected from mixer 18, which is then fed into a phase detector 20 through audio amplifier 19. At the same time, the audio frequency oscillator 10 supplies a reference signal to a phase detector 20 through phase shifter 22.

Figure 2:
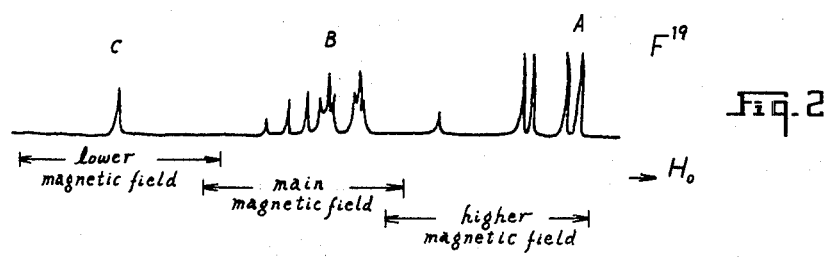
FIGURE 2 is a graphical illustration of the spectrum of the chemical shifts of the $F^{19}$ nucleus using our new method.

Thus, by setting the phase of the reference signal either at 0° or 90° by means of the phase shifter 22, either the dispersion mode or absorption mode can be respectively selected. As a result, the output signal is indicated by indicator 21, such as a recorder or cathode ray oscilloscope, the horizontal axes of the indicator are continuously swept with sweep source 30. Thus, by carrying out the above described method, the spectra of the $F^{19}$ nucleus, for example, as shown in FIGURE 2 can be obtained.

We will now explain the field/frequency control system using proton nucleus in accordance with the present invention.

The output signal from the RF transmitter 7 is fed into a bridge detection circuit 24 through attenuator 23 and applied to the RF coil 37. When the magnetic field $H_0$ of the unidirectional magnetic field satisfies the condition $$H_o = \frac{1}{\gamma_H}(\omega_1 - n\omega_m)$$

where $\gamma_H$ = gyromagnetic ratio of the proton,
$\omega_1$ = angular frequency of the RF driving magnetic field, $\omega_m$=angular frequency of the audio magnetic field, and
$n$=zero or any integer, the gyromagnetic resonance of the proton occurs and is detected by bridge detection circuit 24. In the above equation, the lower magnetic field side band, main band and the higher magnetic field side band are respectively determined according to whether $n=+1$, 0, $-1$. The output signal from the bridge detection circuit 24 is fed into a detector 26 after being amplified by amplifier 25, after which, the output signal is again amplified by a narrow band amplifier 27 and detected by means of a lock-in detection system incorporated in phase detector 28. At this time, the reference signal is applied from the audio frequency oscillator 10 to phase detector 28 through a phase shifter 29, the phase of which, in this case, is set so the output signal from the phase detector 28 is fed into a flux stabilizer 32 through phase shifter 31, and then fed back to a magnetic field compensation coil 33.

In order to keep the field constant at the control sample, irrespective of sweeping the field at the sample to be measured, an additional field that is equal in magnitude but reverse in direction to the field produced by the sweep coil 12 is superimposed by a reverse coil 34, which is arranged in the vicinity of the control sample 2 and which is connected in parallel with the variable resistor 38, so as to cancel out the magnetic field generated by the coil 12. In this arrangement, the output from the sweep source 30 is fed into swep coil 12.

The reversed magnetic field, however, which has the same intensity as the swept magnetic field, is applied to the control sample so as to cancel out the magnetic field applied to the control sample and thus ensure that the control sample is subjected to a constant magnetic field at all times. When measuring the chemical shifts of the $F^{19}$ nucleus, the unidirectional magnetic field must be swept over a range of about 300 p.p.m., since the chemical shift is approximately 300 p.p.m. Therefore, a reversed magnetic field of about 300 p.p.m. is also generated in the reverse coil 34. However, as the reverse coil is very small in size, such a high reversed field is followed by an additional undesirable field inhomogeneity, which results in control sample's line broadening and instability occurring.

This invention overcomes these difficulties by dividing the 300 p.p.m. into several parts and sweeping each part, which is stabilized by the side band signals of proton corresponding to each part, separately. By doing this, the sweep range is kept to within 100 p.p.m. The purpose of this invention will be readily apparent from the following explanation.

Figure 3:
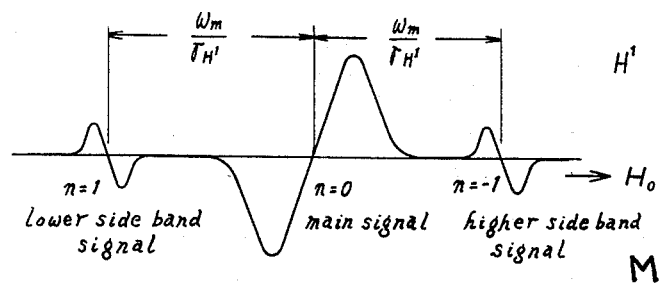
FIGURE 3 is a graphical illustration of dispersion mode spectra of the proton where the magnetic field intensity is identical to that utilized in FIGURE 2.
Figure 4:
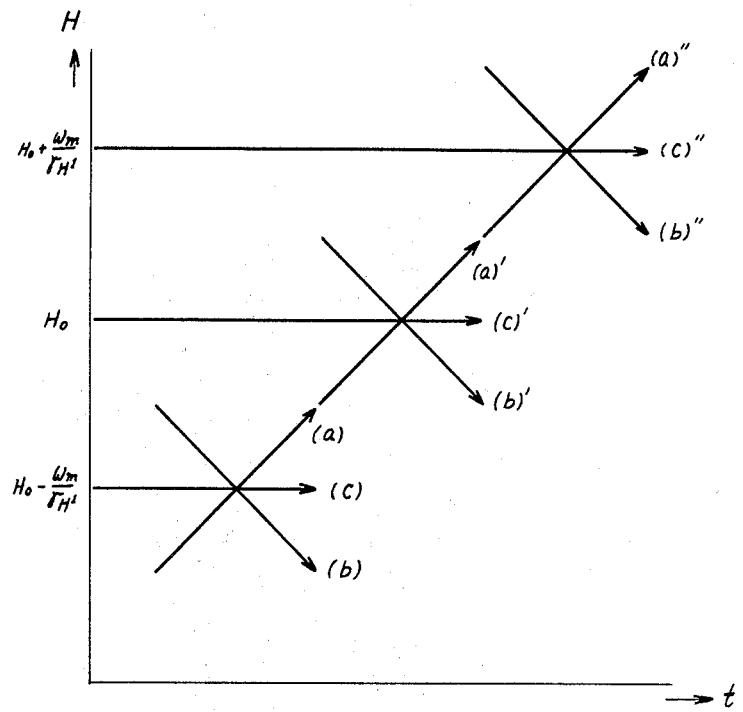
FIGURE 4 is a vector illustration of the polarizing magnetic field applied to the control sample using our method; and, FIGURE 5 is a graphical illustration of the spectrum of the chemical shifts of the $F^{19}$ nucleus obtained by using the present invention.

The output current from the sweep source 30, which is synchronized with the movement of the longitudinal axis of the indicator, is applied to the sweep coil 12 which produces the sweep field superimposed on the unidirectional magnetic field, both on the sample 1 to be measured and the control sample 2. The swept field for the control sample is cancelled out by the reverse coil 34. The field/frequency control is operated by utilizing either the main band or one of the side bands of the proton resonance signal, for example, the lower magnetic field is controlled by the lower side band signal ($n=1$), the main magnetic field by the main signal ($n=0$) and so on. This is illustrated in FIGURES 2, 3, 4 and 5. FIGURE 2 shows an example of the magnetic resonance spectrum of the $F^{19}$ nucleus and FIGURE 3 shows the dispersion mode signals of the proton when water is used as the control sample. In this figure, only the main and the first side band signals are shown, the distance between them being $\omega_m/\gamma_H^1$. In FIGURE 4, the abscissa shows the time or the longitudinal axis of the recorder and the ordinate indicates the magnetic field intensity. The lines $(a)$, $(a)'$ and $(a)''$ show the magnetic fields swept by the swep coil 12, the lines $(b)$, $(b)'$ and $(b)''$ the reversed magnetic fields swept by the reverse coil 34, and $(c)$, $(c)'$ and $(c)''$ the resultant magnetic fields that act on the control sample and which are controlled by the field/frequency control so as to maintain the resonance condition of the lower, main and higher side band signals respectively. In this case, as is apparent from FIGURE 3, since the polarity of the main band dispersion mode is reversed with respect to the side band signals, the output signal from the phase detector 28 must be fed back to the compensation coil 33 through the flux stabilizer 32 after changing the phase by means of the phase shifter 31. Furthermore, the setting of the unidirectional field, viz., $$H_o + \frac{\omega_m}{\gamma_H}$$

or $$H_o - \frac{\omega_m}{\gamma_H}$$

is carried out by changing the excitation current from the excitation source 35.

Figure 5:
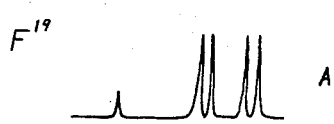
Figure 5:
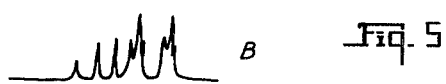
Figure 5:

FIGURE 5 shows the spectrum of the chemical shifts of the $F^{19}$ nucleus observed by utilizing the present invention. It will be noted that although the chemical shift is very wide (about 300 p.p.m.), observation is possible without side band signal overlapping. Moreover, the base line is quite stable. The spectrum is divided into three parts A, B and C, each of which is swept independently. A is in the higher side band field/frequency control region, B in the main band field/frequency control region and C is in the lower side band field/frequency control region.

Consequently, this invention provides a means and an apparatus for measuring wide chemical shifts, while at the same time maintaining high stability and high resolution, in such a manner as to divide the whole of the sweep region into several parts and by individually applying field/frequency control to each of the divided parts.

While certain presently preferred embodiments of our invention have been described, it is to be understood that it may be otherwise embodied within the scope of the appended claims.

We claim:
1. In a method of producing a gyromagnetic resonance spectrum of a sample in which a first sample is positioned in a polarizing magnetic field, and subjected to a radio frequency magnetic field normal to said polarizing field, the polarizing magnetic field being modulated by an oscillator so as to superimpose an audio frequency field on the polarizing field to cause side band resonances in said first sample by sweeping the polarizing field to cause the first sample to be in resonance with the radio frequency magnetic field, the improvement comprising:
   (A) positioning a second sample in the polarizing field;
   (B) modulating the polarizing magnetic field in the vicinity of said second sample to produce side band resonance therein, the frequency of said modulation being substantially the same as the modulation frequency applied to the first sample;
   (C) subjecting the second sample to a second radio frequency magnetic field normal to said polarizing field and adjusting said polarizing magnetic field to cause said second sample to resonate at a selected one of the side band frequencies;
   (D) detecting fluctuations in the resonance signal of said second sample and applying a correction signal dependent on said fluctuations to the polarizing magnetic field independently of the polarizing magnetic field sweep so as to maintain a constant intensity ratio between the polarizing and first radio frequency magnetic fields;
   (E) sweeping the polarizing magnetic field over a range substantially the same as the side band separation of the second sample and detecting signals produced by the said first sample;
   (F) adjusting said polarizing magnetic field to cause the second sample to resonate at another of the side bands or main frequency band and performing upon each said adjusted polarizing magnetic field steps D and E; and (G) repeating step F a plurality of times using the appropriate side band or main resonances of the second sample to produce a complete spectrum of the first sample.

2. The improvement claimed in claim 1, wherein said second sample is a proton sample.

3. The improvement claimed in claim 1 wherein the second sample signal is processed for producing the correction signal by passing the sample signal through a flux stabilizer, the output of which is used to stabilize the polarizing magnetic field.

4. The improvement claimed in claim 1 which includes producing a reverse polarizing magnetic field in the vicinity of said second sample substantially equal in magnitude to the sweep in said polarizing field to cause said first sample to resonate, thereby isolating said second sample from said sweep of the polarizing field.

5. The improvement claimed in claim 1 wherein the radio frequency magnetic field to be applied to the first sample is produced by mixing two different radio frequencies and selecting the lower beat signal from the mixed radio frequency so as to be equal to the resonance frequency of the first sample, one of the two different radio frequencies being preselected to the resonance frequency of the second sample.

6. In a method of producing a gyromagnetic resonance spectrum of a sample in which a first sample is positioned in a swept polarizing magnetic field and subjected to a radio frequency magnetic field normal to said polarizing field, the improvement comprising:

(A) positioning a second sample in the polarizing field;

(B) modulating the polarizing magnetic field by an oscillator so as to superimpose an audio frequency field on the polarizing field, the modulation index of said modulation being less than unity;

(C) processing the resonance signal produced by said first sample to make it comparable with the oscillator signal by
   (i) feeding the resonance signal to an RF mixer,
   (ii) applying a signal produced by a local oscillator to said mixer,
   (iii) filtering the output of the RF mixer to produce a signal the frequency of which is equal to a preselected intermediate frequency plus or minus the frequency of the audio oscillator,
   (iv) applying said filtered output to a second mixer, and at the same time,
   (v) feeding into said second mixer a reference signal of intermediate frequency to produce an output signal having a frequency equal to that of the audio oscillator, said reference signal being a signal obtained by mixing a signal corresponding in frequency to the radio frequency magnetic field with the output of the local oscillator;

(D) comparing the processed sample signal produced by the second mixer with the audio oscillator signal to produce a signal indicative of the resonance of the first sample;

(E) subjecting the second sample to a second radio frequency magnetic field normal to said polarizing field and adjusting said polarizing magnetic field to cause said second sample to resonate at a selected side band;

(F) detecting fluctuations in the resonance signal of said second sample and applying a correction signal dependent on said fluctuations to the polarizing magnetic field independently of the polarizing magnetic field sweep so as to maintain a constant intensity ratio between the polarizing and first radio frequency magnetic fields;

(G) sweeping the polarizing magnetic field over a range substantially the same as the side band separation of the second sample and detecting signals produced by the said first sample;

(H) adjusting said polarizing magnetic field to cause the second sample to resonate at another of the side bands or main frequency band and performing upon each said adjusted polarizing magnetic field steps G and H; and (I) repeating step H a plurality of times using the appropriate side band or main resonances of the second sample to produce a complete spectrum of the first sample.

References Cited

UNITED STATES PATENTS

| | | | |
|---|---|---|---|
| 3,034,040 | 5/1962 | Williams | 324—.5 |
| 3,127,556 | 3/1964 | Gielow | 324—.5 |
| 3,173,083 | 3/1965 | Anderson | 324—.5 |
| 3,173,084 | 3/1965 | Anderson | 324—.5 |
| 3,284,700 | 11/1966 | Kingston | 324—.5 |

GERARD R. STRECKER, Primary Examiner

MICHAEL J. LYNCH, Assistant Examiner